(12) United States Patent
Kasajima (10) Patent No.: US 8,416,207 B2
(45) Date of Patent: Apr. 9, 2013

(54) INPUT DEVICE

(75) Inventor: Yasushi Kasajima, Nara (JP)

(73) Assignee: Rohm Co., Ltd., Kyoto (JP)

( * ) Notice: Subject to any disclaimer, the term of this patent is extended or adjusted under 35 U.S.C. 154(b) by 496 days.

(21) Appl. No.: 12/651,675

(22) Filed: Jan. 4, 2010

(65) Prior Publication Data
US 2010/0224424 A1 Sep. 9, 2010

(30) Foreign Application Priority Data

Jan. 7, 2009 (JP) .................................. 2009-001438

(51) Int. Cl.
*G06F 3/041* (2006.01)
*G06F 3/033* (2006.01)
*G09G 5/00* (2006.01)

(52) U.S. Cl. ..................... 345/173; 345/174; 178/18.01; 178/18.06

(58) Field of Classification Search .................. 345/156, 345/173, 174, 661; 178/18.01, 18.06
See application file for complete search history.

(56) References Cited

U.S. PATENT DOCUMENTS

| 2007/0074914 | A1* | 4/2007 | Geaghan et al. ........... 178/18.06 |
| 2007/0146325 | A1* | 6/2007 | Poston et al. .................. 345/163 |
| 2008/0041640 | A1* | 2/2008 | Gillespie et al. ........... 178/18.01 |
| 2008/0048997 | A1* | 2/2008 | Gillespie et al. ............... 345/174 |
| 2009/0141046 | A1* | 6/2009 | Rathnam et al. ............... 345/661 |
| 2010/0134422 | A1* | 6/2010 | Borras ........................... 345/173 |
| 2011/0210934 | A1* | 9/2011 | Lee et al. ...................... 345/173 |

FOREIGN PATENT DOCUMENTS

JP 2008-33777 2/2008
KR 10-1033997 * 12/2008

* cited by examiner

*Primary Examiner* — Quan-Zhen Wang
*Assistant Examiner* — Michael J Eurice
(74) *Attorney, Agent, or Firm* — Hamre, Schumann, Mueller & Larson, P.C.

(57) ABSTRACT

An input device includes a plurality of detectors for respectively detecting a close approach of an approaching object, and a controller including a plurality of input channels. The plurality of detectors is aligned in a direction. Each of the detectors belongs to one of a plurality of groups each of which two or more detectors belong to. The plurality of detectors in each of the groups is connected in common to one of the input channels associated therewith in the controller. A permutation of the groups which at least three detectors, continuously aligned thus forming a set and arbitrarily selected from the plurality of detectors, respectively belong to is different by each set of at least three detectors.

18 Claims, 7 Drawing Sheets

INPUT DEVICE

FIELD OF THE INVENTION

The present invention relates to an input device that can detect a position of an approaching object.

DESCRIPTION OF THE RELATED ART

Figure 5:
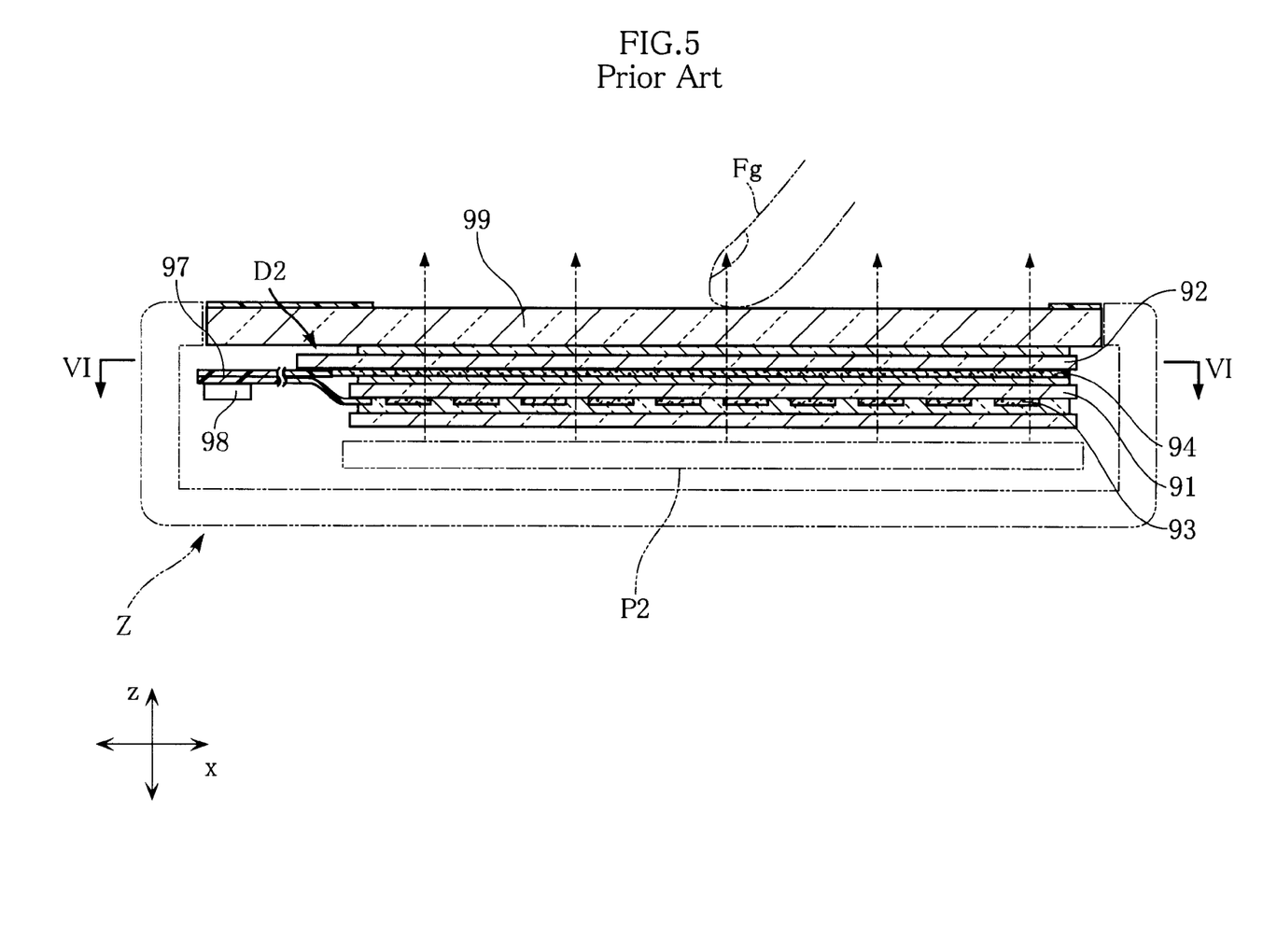
FIG. 5 is a cross-sectional view of a conventional input device incorporated in a mobile phone.
Figure 6:
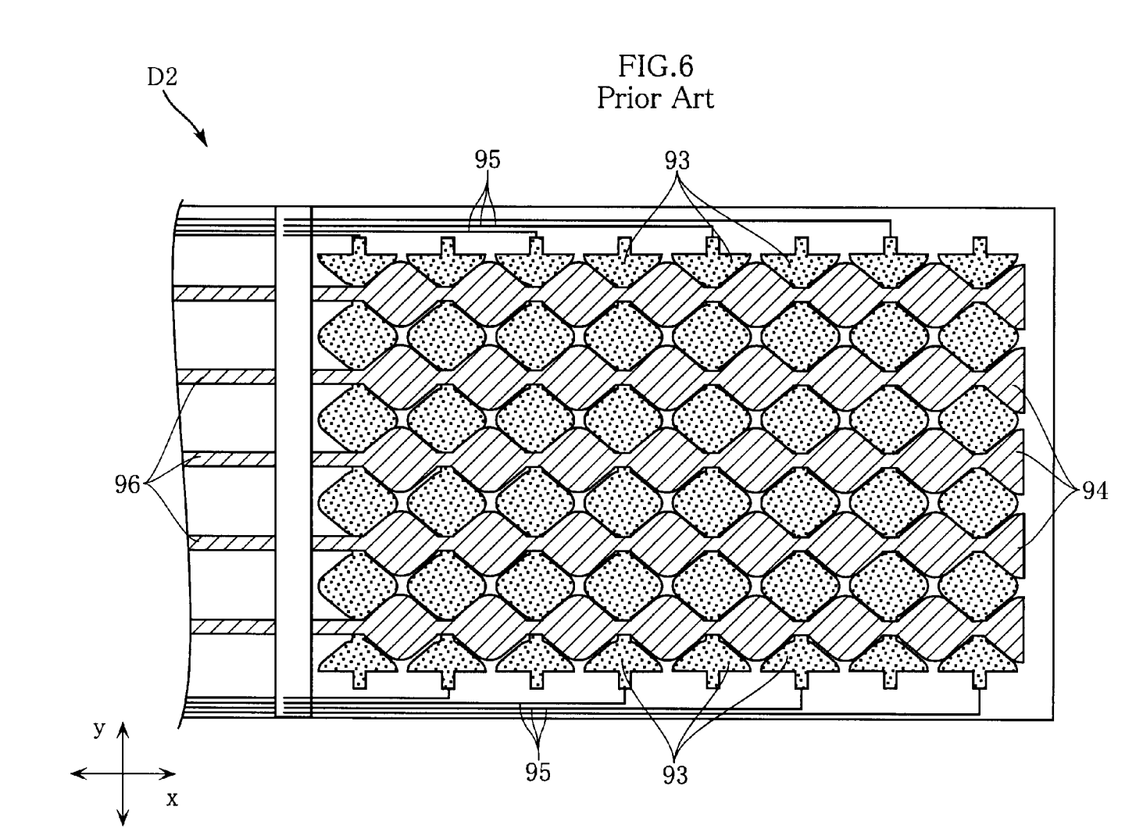
FIG. 6 is a fragmentary cross-sectional view taken along a line VI-VI in FIG. 5.

FIGS. 5 and 6 depict an input device D2, representing a conventional input device incorporated in, for example, a mobile phone Z. FIG. 5 is a cross-sectional view of the input device D2. FIG. 6 is a fragmentary cross-sectional view taken along a line VI-VI in FIG. 5.

The input device D2 includes a transparent substrate 91, a transparent substrate 92 (not shown in FIG. 6), a plurality of electrodes 93 for position detection in an x-direction, a plurality of electrodes 94 for position detection in a y-direction, wirings 95, 96, a flexible substrate 97 (partially shown in FIGS. 5 and 6), and an IC chip 98, and is configured detect a position of an approaching object (for example, a finger Fg).

The transparent substrates 91, 92 are located parallel to each other. The plurality of electrodes 93 for x-direction position detection is formed in a pattern on the transparent substrate 91. The electrodes 93 each extend in the y-direction parallel to each other, and are spaced from each other in the x-direction. The plurality of electrodes 94 for y-direction position detection is formed in a pattern on the transparent substrate 92. The electrodes 94 each extend in the x-direction parallel to each other, and are spaced from each other in the y-direction. The flexible substrate 97 is attached to an end portion of the transparent substrate 92, and the wirings 95 are provided on the transparent substrate 91 and the flexible substrate 97, and each connected to one of the electrodes 93 on the transparent substrate 91. The wirings 96 are provided on the transparent substrate 92 and the flexible substrate 97, and each connected to one of the electrodes 94 on the transparent substrate 92. The IC chip 98 includes a plurality of input terminals for x-direction position detection and a plurality of input terminal for y-direction position detection, and is located on the flexible substrate 97. To each of the input terminals for x-direction position detection of the IC chip 98, the wirings 95 are electrically connected, respectively. To each of the input terminals for y-direction position detection of the IC chip 98, the wirings 96 are electrically connected, respectively. Thus, the IC chip 98 is configured, in the case where the plurality of electrodes 93 electrically connected to the plurality of input terminals for x-direction position detection through the wirings 95 each serves as one of a capacitor electrode pair, so as to detect static capacitance and fluctuation thereof of such capacitor. Likewise, the IC chip 98 is configured, in the case where the plurality of electrodes 94 electrically connected to the plurality of input terminals for y-direction position detection through the wirings 96 each serves as one of a capacitor electrode pair, so as to detect static capacitance and fluctuation thereof of such capacitor.

As shown in FIG. 5, the mobile phone Z includes a transparent cover 99 that constitutes a part of a casing thereof. The input device D2 is bonded to the transparent cover 99 with a transparent adhesive. At a lower position from the input device D2 based on the orientation of FIG. 5, an LCD panel P2 is located. The input device D2 is located on the side of the display screen of the LCD panel P2, and constitutes what is known as a touch panel. The touch panel device serves as both displaying and operating unit of the mobile phone Z. When a user is to operate the mobile phone Z, the user brings a finger Fg or the like close to or into contact with the transparent cover 99, to thereby utilize the touch panel device, hence the input device D2.

When the user of the mobile phone Z brings the finger Fg close to or into contact with the transparent cover 99, the finger Fg and the electrodes 93 in the input device D2 located close to the finger Fg constitute a capacitor electrode pair of a relatively small spacing between each other. Likewise, the finger Fg and the electrodes 94 in the input device D2 located close to the finger Fg constitute a capacitor electrode pair of a relatively small spacing between each other. As a result, a signal corresponding to fluctuation in static capacitance of the capacitor electrode is input from the electrodes 93 constituting the capacitor electrode pair with the finger Fg, to the IC chip 98 through one of the input terminals for x-direction position detection, and also a signal corresponding to fluctuation in static capacitance of the capacitor electrode is input from the electrodes 94 constituting the capacitor electrode pair with the finger Fg, to the IC chip 98 through one of the input terminals for y-direction position detection. The IC chip 98 detects, upon receipt of such signals, the fluctuation in static capacitance with respect to each of the electrodes 93 constituting the capacitor electrode pair with the finger Fg, and the fluctuation in static capacitance with respect to each of the electrodes 94 constituting the capacitor electrode pair with the finger Fg.

Figure 7:
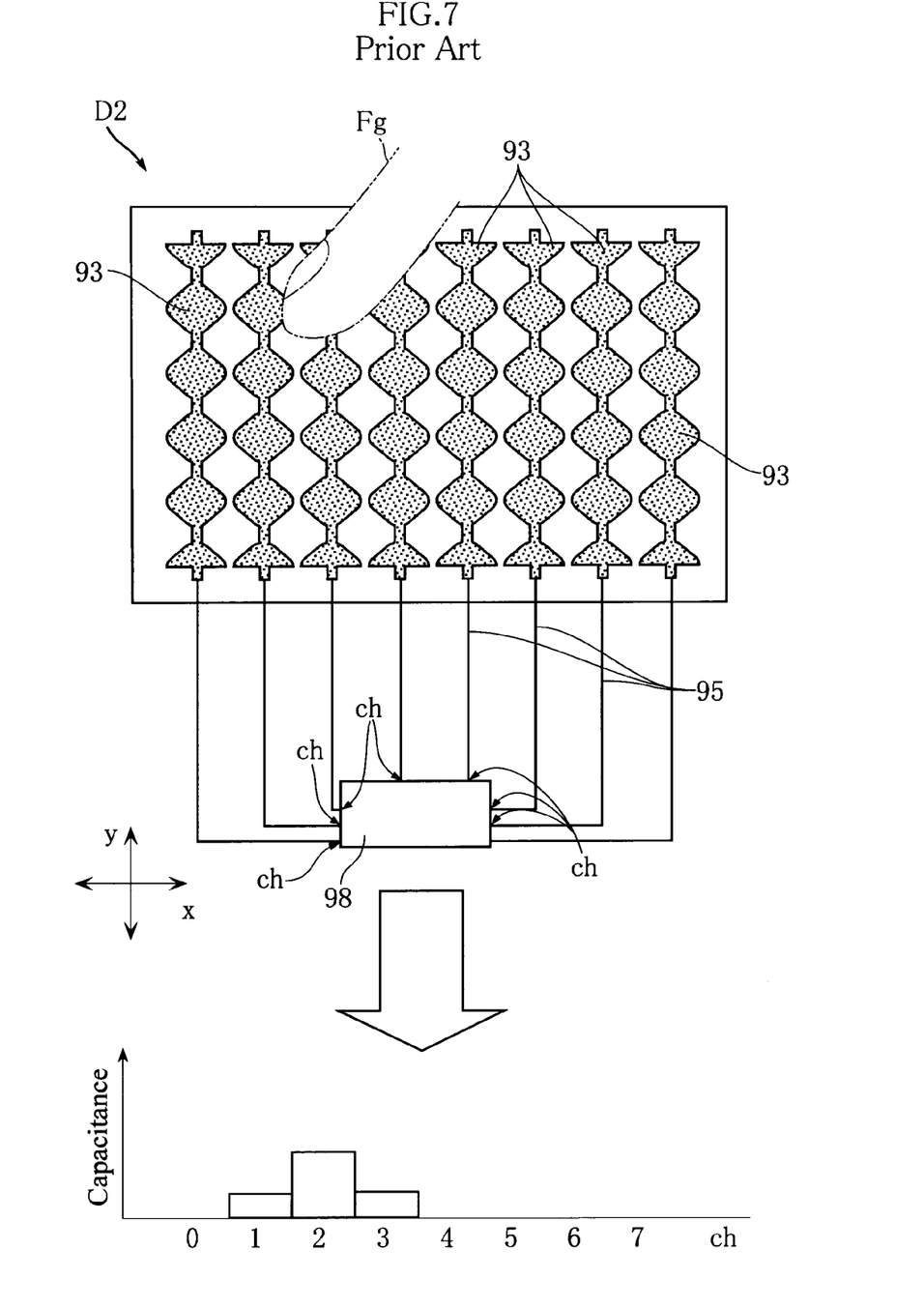
FIG. 7 includes a schematic diagram showing a connection arrangement between an IC chip and a plurality of electrodes for detection in the input device shown in FIG. 6, and a graph showing an example of static capacitance fluctuation detected by the IC chip through the set of input terminal (input channel) in the IC chip.

FIG. 7 includes a schematic diagram showing an electrical connection arrangement between the IC chip 98 (and the plurality of input terminals ch for x-direction position detection) and the plurality of electrodes 93 for x-direction position detection in the input device D2, and a graph showing an example of the fluctuation in static capacitance detected by the IC chip 98 through the plurality of input terminals ch for x-direction position detection (the graph indicates the increments of the static capacitance).

In the input device D2, the electrodes 93 located close to the finger Fg and constituting the capacitor electrode pair with the finger Fg are identified based on the fluctuation in static capacitance detected by the IC chip 98 through the input terminals for x-direction position detection, and based on such identification, information of a position in the x-direction closely approached by the finger Fg is obtained. In the input device D2, also, the electrodes 94 located close to the finger Fg and constituting the capacitor electrode pair with the finger Fg are identified based on the fluctuation in static capacitance detected by the IC chip 98 through the input terminals for x-direction position detection, and based on such identification, information of a position in the y-direction closely approached by the finger Fg is obtained. The conventional input device thus arranged can be found, for example, in JP A No. 2008-33777.

In the input device D2, however, a maximum number of the electrodes 93 for x-direction position detection that can be mounted is restricted by the number of input terminals for x-direction position detection in the IC chip 98. Likewise, a maximum number of the electrodes 94 for x-direction position detection that can be mounted is restricted by the number of input terminals for y-direction position detection in the IC chip 98.

In the input device D2 thus configured, for example in order to improve the accuracy in position detection with the size of the detection region unchanged, the number of electrodes 93 and electrodes 94 has to be increased (assuming that the detection region size remains the same, providing a greater number of electrodes 93 and electrodes 94 in the detection region results in higher position detection accuracy). Accordingly, in order to improve the position detection accuracy with the detection region size unchanged in the input device D2, another IC chip including a greater number of input terminals than the IC chip 98 has to be prepared and installed in the input device D2 in place of the IC chip 98.

Also, for example, in order to expand the detection region with the position detection accuracy unchanged in the input device D2, the number of electrodes 93 and electrodes 94 has to be increased (in order to maintain the position detection accuracy, a greater number of electrodes 93 and electrodes 94 have to be provided in the expanded detection region). Accordingly, in order to expand the detection region with the position detection accuracy unchanged in the input device D2, another IC chip including a greater number of input terminals than the IC chip 98 has to be prepared and installed in the input device D2 in place of the IC chip 98.

SUMMARY OF THE INVENTION

The present invention has been proposed under the foregoing situation, with an object to provide an input device including a greater number of detectors than the number of input channels provided in a controller, to thereby detect a position of an approaching object.

A first aspect of the present invention provides an input device, comprising a plurality of detectors for respectively detecting a close approach of an approaching object, and a controller including a plurality of input channels. The plurality of detectors is aligned in a direction. Each of the detectors belongs to one of a plurality of groups each of which two or more detectors belong to. The plurality of detectors in each of the groups is connected in common to one of the input channels associated therewith in the controller. A permutation of the groups which at least three detectors, continuously aligned thus forming a set and arbitrarily selected from the plurality of detectors, respectively belong to is different by each set of at least three detectors.

Preferably, the controller decides a position in a direction closely approached by the approaching object, based on all of a plurality of detected values obtained through the plurality of input channels. Alternatively, the controller may decide the position in a direction closely approached by the approaching object, based on a part of the plurality of detected values obtained through the plurality of input channels.

Preferably, the controller identifies the position in a direction closely approached by the approaching object and the set of detectors located close to that position, based on the plurality of detected values obtained through the plurality of input channels. In this case, the controller calculates a weighted average with respect to a plurality of positions of the set of detectors in a direction, utilizing the detected values as the weight.

Preferably, the plurality of detectors is constituted of a plurality of electrodes each extending in parallel in a direction intersecting with the direction in which the plurality of detectors is aligned, and the approaching object is electrically conductive. In this case, the controller is capable of detecting fluctuation in static capacitance between the detector belonging to each group and the approaching object caused by the close approach of the approaching object to the detector, with respect to each group. Also in this case, the controller decides the position in a direction closely approached by the approaching object, based on the fluctuation in static capacitance detected with respect to each group.

More preferably, the controller identifies the position in a direction closely approached by the approaching object and the set of detectors located close to that position, based on the fluctuation in static capacitance detected with respect to each group. In this case, the controller calculates a weighted average with respect to a plurality of positions of the set of detectors in a direction, utilizing the fluctuation in static capacitance as the weight.

A second aspect of the present invention provides an input device comprising a plurality of first detectors for respectively detecting a close approach of an approaching object, a plurality of second detectors for respectively detecting a close approach of the approaching object, and a controller. The plurality of first detector is aligned in a first direction. The plurality of second detectors is aligned in a second direction intersecting with the first direction. The controller includes a plurality of first input channels for position detection in the first direction, and a plurality of second input channels for position detection in the second direction. Each of the first detectors belongs to one of a plurality of first groups each of which two or more of the first detectors belong to. The plurality of first detectors in each of the first groups is connected in common to one of the first input channels associated therewith in the controller. A permutation of the first groups which at least three of the first detectors, continuously aligned thus forming a set and arbitrarily selected from the plurality of first detectors, respectively belong to is different by each set of at least three of the first detectors. Each of the second detectors belongs to one of a plurality of second groups each of which two or more of the second detectors belong to. The plurality of second detectors in each of the second groups is connected in common to one of the second input channels associated therewith in the controller. A permutation of the second groups which at least three of the second detectors, continuously aligned thus forming a set and arbitrarily selected from the plurality of second detectors, respectively belong to is different by each set of at least three of the second detectors.

Preferably, the controller decides a position in the first direction closely approached by the approaching object, based on all of a plurality of detected values obtained through the plurality of first input channels, and a position in the second direction closely approached by the approaching object, based on all of a plurality of detected values obtained through the plurality of second input channels. Alternatively, the controller may decide the position in the first direction closely approached by the approaching object, based on a part of the plurality of detected values obtained through the plurality of first input channels, and the position in the second direction closely approached by the approaching object, based on a part of the plurality of detected values obtained through the plurality of second input channels.

Preferably, the controller identifies the position in the first direction closely approached by the approaching object and the set of first detectors located close to that position, based on the plurality of detected values obtained through the plurality of first input channels. In this case, the controller calculates a weighted average with respect to a plurality of positions of the set of first detectors in the first direction, utilizing the detected values as the weight.

Preferably, the controller identifies the position in the second direction closely approached by the approaching object and the set of second detectors located close to that position, based on the plurality of detected values obtained through the plurality of second input channels. In this case, the controller calculates a weighted average with respect to a plurality of positions of the set of second detectors in the second direction, utilizing the detected values as the weight.

Preferably, the plurality of first detectors is constituted of a plurality of electrodes each extending in parallel in a direction intersecting with the first direction, and the approaching object is electrically conductive. In this case, the controller is capable of detecting fluctuation in static capacitance between the first detector belonging to each of the first groups and the approaching object caused by the close approach of the approaching object to the first detector, with respect to each of the first groups. Also in this case, the controller decides the position in the first direction closely approached by the approaching object, based on the fluctuation in static capacitance detected with respect to each of the first groups.

Preferably, the controller identifies the position in a direction closely approached by the approaching object and the set of first detectors located close to that position, based on the fluctuation in static capacitance detected with respect to each of the first groups. In this case, the controller calculates a weighted average with respect to a plurality of positions of the set of first detectors in the first direction, utilizing the fluctuation in static capacitance as the weight.

Preferably, the plurality of second detectors is constituted of a plurality of electrodes each extending in parallel in a direction intersecting with the second direction, and the approaching object is electrically conductive. In this case, the controller is capable of detecting fluctuation in static capacitance between the second detector belonging to each of the second groups and the approaching object caused by the close approach of the approaching object to the second detector, with respect to each of the second groups. Also in this case, the controller decides the position in the second direction closely approached by the approaching object, based on the fluctuation in static capacitance detected with respect to each of the second groups.

Preferably, the controller identifies the position in a direction closely approached by the approaching object and the set of second detectors located close to that position, based on the fluctuation in static capacitance detected with respect to each of the second groups. In this case, the controller calculates a weighted average with respect to a plurality of positions of the set of second detectors in the second direction, utilizing the fluctuation in static capacitance as the weight.

DETAILED DESCRIPTION OF THE PREFERRED EMBODIMENT

Figure 1:
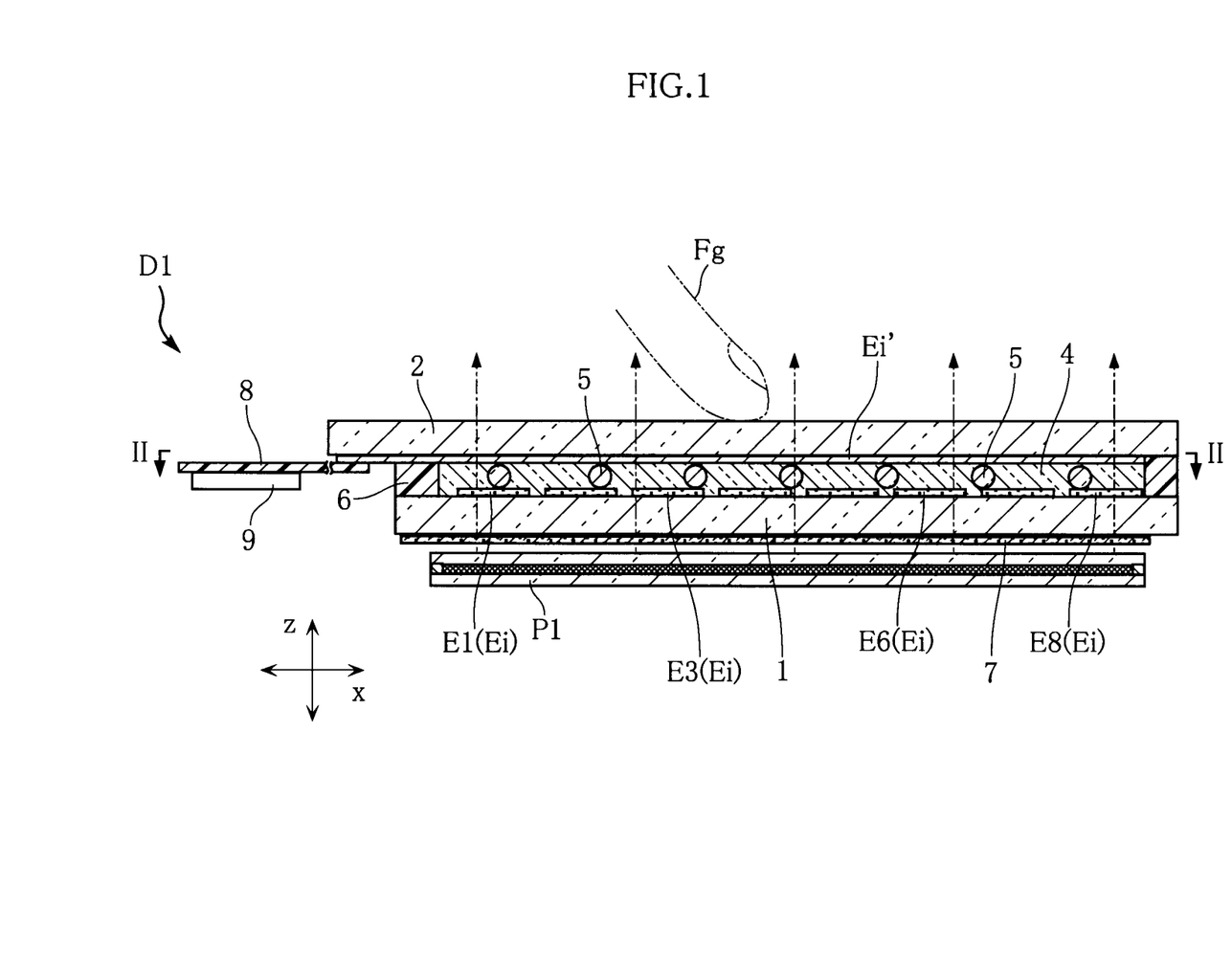
FIG. 1 is a fragmentary cross-sectional view of an input device according to the present invention.
Figure 2:
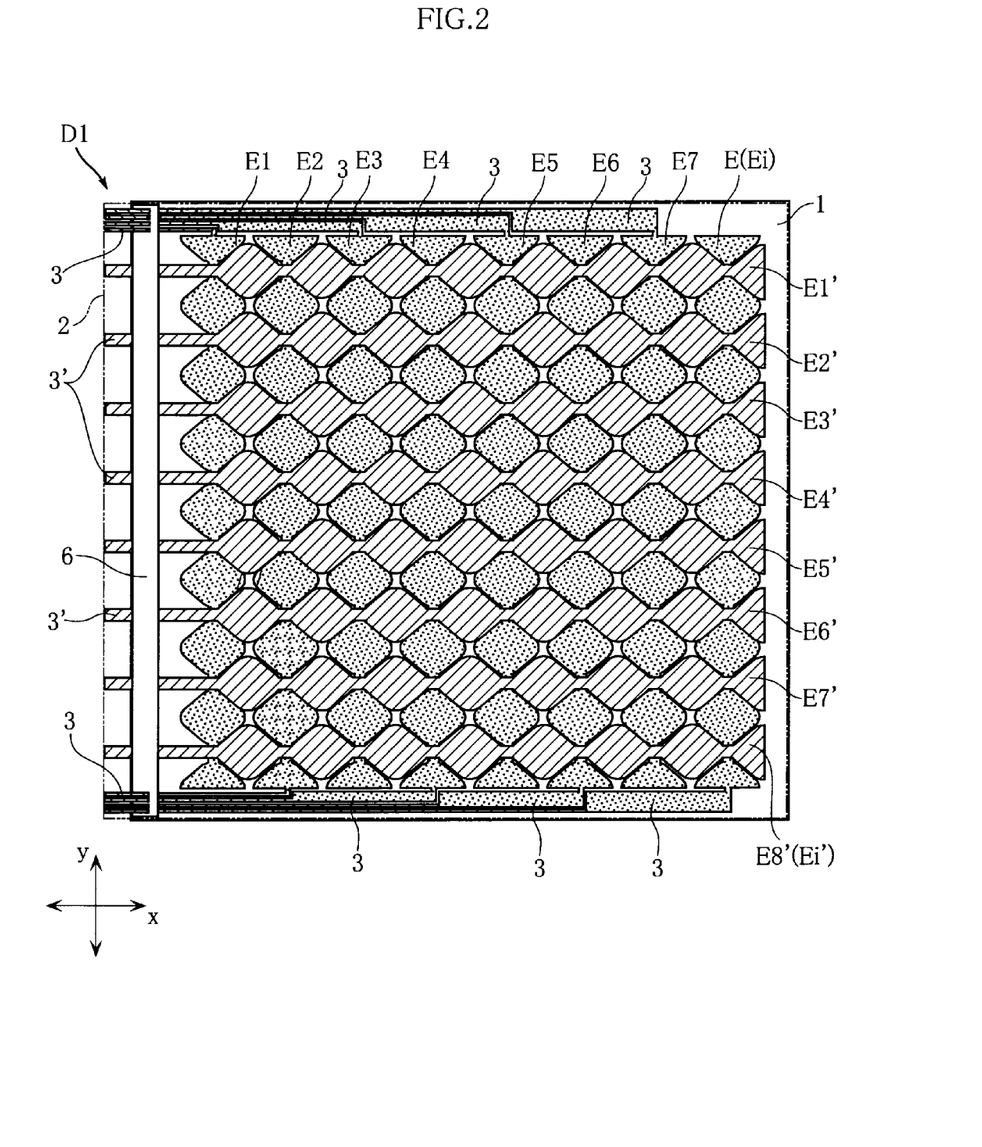
FIG. 2 is a fragmentary cross-sectional view taken along a line II-II in FIG. 1.

FIGS. 1 and 2 depict an input device D1 according to the present invention. The input device D1 includes transmissive plates 1, 2, a plurality of electrodes Ei (i=1, 2, . . . , n) for position detection in an x-direction, a plurality of electrodes Ei' (i=1, 2, . . . , m) for position detection in a y-direction, wirings 3, 3', a resin layer 4 (not shown in FIG. 2), spacers (not shown in FIG. 2), an anisotropic conductive resin portion 6, a shield layer 7, a flexible substrate 8, and an IC chip 9, to thereby detect a position of an approaching object (for example a finger Fg), which is electrically conductive. The input device D1 is located, for example, on the side of a display screen of an LCD panel P1, and constitutes what is known as a touch panel device.

Each of the transmissive plates 1, 2 is a transparent resin substrate or a transparent glass substrate. Examples of the material of the transparent resin substrate include polyethylene terephthalate (PET), polyethylene naphthalate (PEN), and polycarbonate (PC).

The plurality of electrodes Ei (i=1, 2, . . . , n) for x-direction position detection corresponds to a plurality of first detectors, each serving to detect close approach of the approaching object, and is formed in a pattern on an upper face of the transmissive plate 1, based on the orientation of FIG. 1. The plurality of electrodes Ei each extends in the y-direction parallel to each other, and aligned in the x-direction (orthogonal to the y-direction) with an interval between each other. In this embodiment, the number of electrodes Ei (n) is 8. The electrodes Ei are constituted of a transparent conductive material such as ITO or IZO. As shown in FIG. 2, the electrodes Ei each include generally diamond-shaped widened portions and narrowed portions alternately aligned in the y-direction. The widened portion may be circular, polygonal or of other shapes, instead of diamond.

The plurality of electrodes Ei' (i=1, 2, . . . , n) for y-direction position detection corresponds to a plurality of second detectors, each serving to detect close approach of the approaching object, and is formed in a pattern on a lower face of the transmissive plate 2, based on the orientation of FIG. 1. The plurality of electrodes Ei' each extends in the x-direction parallel to each other, and aligned in the y-direction (orthogonal to the x-direction) with an interval between each other. In this embodiment, the number of electrodes Ei' (m) is 8. The electrodes Ei' are constituted of a transparent conductive material such as ITO or IZO. As shown in FIG. 2, the electrodes Ei' each include generally diamond-shaped widened portions and narrowed portions alternately aligned in the x-direction. The widened portion may be circular, polygonal or of other shapes, instead of diamond. The widened portion of the electrodes Ei' is located so as not to overlap the widened portion of the electrodes Ei, in either of the x-direction and the y-direction.

A portion of the wirings 3 is formed in a pattern on the transmissive plate 1. Another portion of the wirings 3 is formed in a pattern on the transmissive plate 2 and the flexible substrate 8. The portion of the wirings 3 on the transmissive plate 1 and the portion thereof on the transmissive plate 2 corresponding to the portion on the transmissive plate 1 are electrically connected through the anisotropic conductive resin portion 6, such that electrical insulation is secured between the portions of the wirings 3 on the transmissive plate 1, as well as between the portions of the wirings 3 on the transmissive plate 2. The anisotropic conductive resin portion 6 is constituted of a hardened anisotropic conductive resin. In the input device D1, the wirings 3 are thus arranged. The wirings 3 are each connected to one of the electrodes Ei on the transmissive plate 1.

The wirings 3' are formed in a pattern on the transmissive plate 2 and the flexible substrate 8, and connected to one of the electrodes Ei' on the transmissive plate 2.

The resin layer 4 and the spacers 5 are interposed between the transmissive plates 1, 2 as shown in FIG. 1. The resin layer 4 is constituted of a highly light-transmissive resin, and serves as a bond between transmissive plates 1, 2. Also, the resin layer 4 secures electrical insulation between the electrodes Ei, between the electrodes Ei', and between the electrodes Ei and Ei'. The spacers 51 are a granular material constituted of silica or an acrylic resin (for example, Micropearl series from Sekisui Chemical Co., Ltd.). Appropriately selecting a proper size of the spacer 5 allows securing a proper spacing between the transmissive plates 1, 2.

The shield layer 7 is provided on the lower face of the transmissive plate 1 based on the orientation of FIG. 1. The shield layer 7 is constituted of a transparent conductive material such as ITO or IZO. The shield layer 7 is covered with a rear cover layer (not shown). The shield layer 7 serves to block an external noise.

The flexible substrate 8 is attached to an end portion of the transmissive plate 2, as shown in FIG. 1. As stated above, a portion of the wirings 3 and 3' is also patterned on the flexible substrate 8.

The IC chip 9 corresponds to the controller, and is mounted on the flexible substrate 8. The IC chip 9 includes a plurality of input terminals (input channels) for x-direction position detection, and a plurality of input terminals (input channels) for y-direction position detection. In this embodiment, the IC chip 9 includes the input terminals ch0 to ch3 for x-direction position detection, and the input terminals ch0' to ch3' for y-direction position detection.

Figure 3:
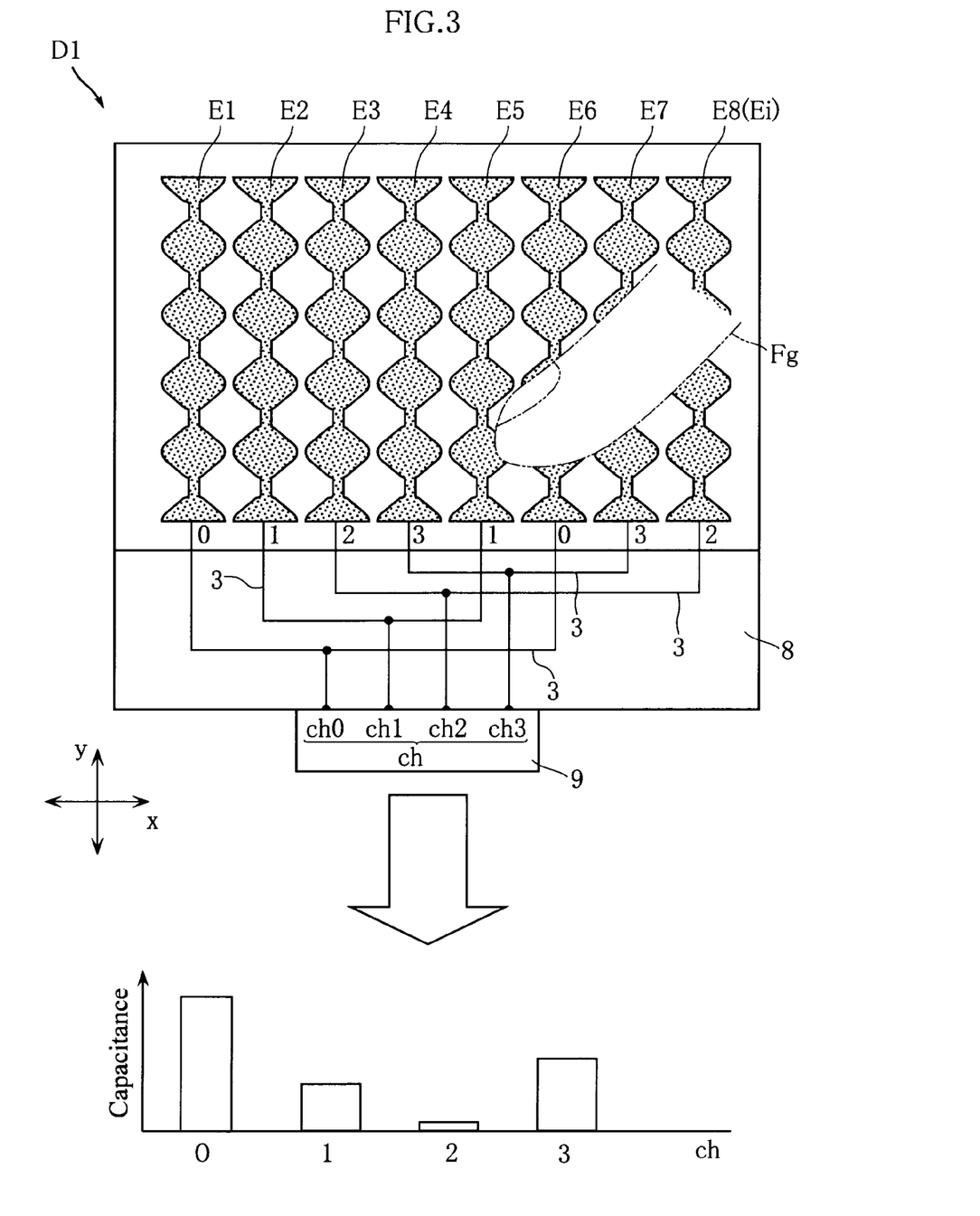
FIG. 3 includes a schematic diagram showing a connection arrangement between an IC chip and a plurality of electrodes for detection in the input device shown in FIG. 1, and a graph showing an example of static capacitance fluctuation detected by the IC chip through a set of input terminals (input channels) in the IC chip.

FIG. 3 includes a schematic diagram showing a connection arrangement between the IC chip 9 (more particularly, input terminals ch0 to ch3 for x-direction position detection) and the plurality of electrodes Ei for x-direction position detection in the input device D1.

In this embodiment, two of the electrodes Ei constituting a pair are electrically connected in common to one of the input terminals ch0 to ch3, thereby constituting a group. More specifically, a pair of electrodes E1, E6 is electrically connected in common to the input terminal ch0, and thereby constitutes a group associated with the input terminal ch0. A pair of electrodes E2, E5 is electrically connected in common to the input terminal ch1, and thereby constitutes a group associated with the input terminal ch1. A pair of electrodes E3, E8 is electrically connected in common to the input terminal ch2, and thereby constitutes a group associated with the input terminal ch2. A pair of electrodes E4, E7 is electrically connected in common to the input terminal ch3, and thereby constitutes a group associated with the input terminal ch3. Thus, the plurality of electrodes Ei (electrodes E1 to E8) each belongs to one of the plurality of groups each of which two of the electrodes Ei belong to.

In the input device D1, a permutation of the groups which at least three electrodes Ei, continuously aligned thus forming a set and arbitrarily selected from the plurality of electrodes Ei, respectively belong to is different by each set of at least three electrodes Ei. This can be paraphrased as follows.

The electrodes. E1 to E3, the electrodes E2 to E4, the electrodes E3 to E5, the electrodes E4 to E6, the electrodes E5 to E7, and the electrodes E6 to E8 respectively form the set of electrodes Ei. Then, the permutation of the groups which the electrodes E1 to E3 respectively belong to (0, 1, 2), the permutation of the groups which the electrodes E2 to E4 respectively belong to (1, 2, 3), the permutation of the groups which the electrodes E3 to E5 respectively belong to (2, 3, 1), the permutation of the groups which the electrodes E4 to E6 respectively belong to (3, 1, 0), the permutation of the groups which the electrodes E5 to E7 respectively belong to (1, 0, 3), and the permutation of the groups which the electrodes E6 to E8 respectively belong to (0, 3, 2) are different from one another.

The foregoing can also be paraphrased as follows.

The electrodes E1 to E4, the electrodes E2 to E5, the electrodes E3 to E6, the electrodes E4 to E7, and the electrodes E5 to E8 respectively form the set of electrodes Ei. Then, the permutation of the groups which the electrodes E1 to E4 respectively belong to (0, 1, 2, 3), the permutation of the groups which the electrodes E2 to E5 respectively belong to (1, 2, 3, 1), the permutation of the groups which the electrodes E3 to E6 respectively belong to (2, 3, 1, 0), the permutation of the groups which the electrodes E4 to E7 respectively belong to (3, 1, 0, 3), and the permutation of the groups which the electrodes E5 to E8 respectively belong to (1, 0, 3, 2) are different from one another.

The IC chip 9 in the input device D1 is configured, in the case where the plurality of electrodes Ei electrically connected to the input terminals ch0 to ch3 for x-direction position detection through the wirings 3 each serves as one of a capacitor electrode pair, so as to detect static capacitance and fluctuation thereof of such capacitor.

In a practical use of the input device D1, when the user brings the finger Fg close to or into contact with the transmissive plate 2, the finger Fg and the electrodes Ei in the input device D1 located close to the finger Fg constitute a capacitor electrode pair of a relatively small spacing between each other. As a result, a signal corresponding to fluctuation in static capacitance of the capacitor electrode is input from the electrodes Ei constituting the capacitor electrode pair with the finger Fg, to the IC chip 9 through the wiring 3 and one of the input terminals ch0 to ch3 for x-direction position detection. The IC chip 9 detects, upon receipt of such signal, the fluctuation in static capacitance with respect to each group including the electrode Ei constituting the capacitor electrode pair with the finger Fg.

FIG. 3 also includes a graph showing an example of the fluctuation in static capacitance of each group detected by the IC chip 9 through the input terminals ch0 to ch3 for x-direction position detection (the graph indicates the increments of the static capacitance).

The IC chip 9 decides the position in the x-direction closely approached by the approaching object (for example the finger Fg), based on the fluctuation in static capacitance detected with respect to each group which two of the electrodes Ei belong to. In the case where the finger Fg has contacted the transmissive plate 2 (not shown in FIG. 3) of the input device D1 at the position shown in FIG. 3, the IC chip 9 takes the following steps to decide the position in the x-direction closely approached by the finger Fg. Among the electrodes E1 to E8, the electrode E6 overlaps by a largest area with the contact region between the transmissive plate 2 and the finger Fg shown in FIG. 3; the electrode E7 by a second largest area; and the electrode E5 by a third largest area. The electrode E8 does not overlap with the contact region between the transmissive plate 2 and the finger Fg, but overlaps with a region on the transmissive plate 2 closely approached by the finger Fg but not contacted thereby.

First, in the case where the finger Fg has contacted the transmissive plate 2 (not shown in FIG. 3) of the input device D1 at the position shown in FIG. 3, the IC chip 9 detects the static capacitance fluctuation as shown in the graph of FIG. 3, with respect to each group which two electrodes Ei belong to, in other words with respect to each input terminal for x-direction position detection.

The IC chip 9 then compares the magnitude of the static capacitance fluctuation of each group, or each input terminal.

Then, the IC chip 9 decides to which set of the electrodes Ei (three or four continuously aligned electrodes Ei) the region where the finger Fg is present corresponds, based on the magnitude order of the three largest static capacitance fluctuation values among the four, except for the smallest static capacitance fluctuation value, or on the magnitude of all the four static capacitance fluctuation values.

To decide to which set of the electrodes Ei (three continuously aligned electrodes Ei) the region where the finger Fg is present corresponds, based on the magnitude order of the three largest static capacitance fluctuation values, the IC chip 9 takes the following steps.

When the finger Fg brought into contact with the transmissive plate 2 (not shown in FIG. 3) at the position shown in FIG. 3, the group that presents the largest static capacitance fluctuation (including two electrodes E1, E6) is the group associated with the input terminal ch0. The group that presents the second largest static capacitance fluctuation (including two electrodes E4, E7) is the group associated with the input terminal ch3. The group that presents the third largest static capacitance fluctuation (including two electrodes E2, E5) is the group associated with the input terminal ch1. Based on such facts recognized by the IC chip 9, the finger Fg can be identified to be present in the region corresponding to the set of electrodes E5 to E7 (the permutation of the groups which these electrodes respectively belong to is (1, 0, 3). No set of three continuously aligned electrodes Ei in the input device D1 according to this embodiment forms a permutation of groups as (3, 0, 1)). Thus, based on the static capacitance fluctuation detected with respect to each group which the electrodes Ei belong to, the position in the x-direction closely approached by the finger Fg, as well as the set of electrodes Ei located close thereto can be identified.

Then with respect to the plurality of positions of the set of electrodes E5 to E7 in the x-direction, the weighted average is calculated utilizing the detected static capacitance fluctuation as the weight. More particularly, the following formula (1) is employed for the calculation of the weighted average.

$$\frac{W_1 X_1 + W_2 X_2 + W_3 X_3}{W_1 + W_2 + W_3} \quad (1)$$

In the formula (1), $X_1$ represents a central position of the electrode E5 in the x-direction; $X_2$ a central position of the electrode E6 in the x-direction; and $X_3$ a central position of the electrodes E7 in the x-direction. In other words, $X_1$, $X_2$, $X_3$ are respectively a position coordinate of the electrodes E5 to E7 in the x-direction, in the detection region of the input device D1. $W_1$ represents a fluctuation amount of the static capacitance of the group which the electrode E5 belongs to (group associated with the input terminal ch1); $W_2$ a fluctuation amount of the static capacitance of the group which the electrode E6 belongs to (group associated with the input terminal ch0); and $W_3$ a fluctuation amount of the static capacitance of the group which the electrode E7 belongs to (group associated with the input terminal ch3). Then, the weighted average value thus calculated is adopted as the position in the x-direction closely approached by the finger Fg (approaching object).

Also, to decide to which set of the electrodes Ei (four continuously aligned electrodes Ei) the region where the finger Fg is present corresponds, based on the magnitude order of the four static capacitance fluctuation values, the IC chip 9 takes the following steps.

When the finger Fg is brought into contact with the transmissive plate 2 (not shown in FIG. 3) at the position shown in FIG. 3, the group that presents the largest static capacitance fluctuation is, as stated above, the group associated with the input terminal ch0; the group that presents the second largest static capacitance fluctuation is the group associated with the input terminal ch0; the group that presents the third largest static capacitance fluctuation is the group associated with the input terminal ch1; and the group that presents the smallest static capacitance fluctuation is the group associated with the input terminal ch2. Based on such facts recognized by the IC chip 9, the finger Fg can be identified to be present in the region corresponding to the set of electrodes E5 to E8 (the permutation of the groups which these electrodes respectively belong to is (1, 0, 3, 2). No set of four continuously aligned electrodes Ei in the input device D1 according to this embodiment forms a permutation of groups as (2, 3, 0, 1)). Thus, based on the static capacitance fluctuation detected with respect to each group which the electrodes Ei belong to, the position in the x-direction closely approached by the finger Fg, as well as the set of electrodes Ei located close thereto can be identified.

Then with respect to the plurality of positions of the set of electrodes E5 to E8 in the x-direction, the weighted average is calculated utilizing the detected static capacitance fluctuation as the weight. More particularly, the following formula (2) is employed for the calculation of the weighted average.

$$\frac{W_1 X_1 + W_2 X_2 + W_3 X_3 + W_4 X_4}{W_1 + W_2 + W_3 + W_4} \quad (2)$$

In the formula (2), $X_1$, $X_2$, $X_2$ are, as in the formula (1) above, the position coordinate of the electrodes E5 to E7 in the x-direction, in the input device D1. $X_4$ represents a central position of the electrode E8 in the x-direction, and is the position coordinate of the electrode E8 in the x-direction, in the detection region of the input device D1 input device D1. In the formula (2), $W_1$, $W_2$, $W_3$ each represent a fluctuation amount of the static capacitance of the group which the electrodes E5 to E7 respectively belong to. $W_4$ represents a fluctuation amount of the static capacitance of the group which the electrode E8 belongs to (group associated with the input terminal ch2). Then, the weighted average value thus calculated is adopted as the position in the x-direction closely approached by the finger Fg (approaching object).

The IC chip 9 can thus decide the position in the x-direction closely approached by the finger Fg.

Meanwhile, in this embodiment, two of the electrodes Ei' constituting a pair are electrically connected in common to one of the input terminals ch0' to ch3', thereby constituting a group, just as two of the electrodes Ei constituting a pair are electrically connected in common to one of the input terminals ch0 to ch3, thereby constituting a group. More specifically, a pair of electrodes E1', E6' is electrically connected in common to the input terminal ch0', and thereby constitutes a group associated with the input terminal ch0'. A pair of electrodes E2', E5' is electrically connected in common to the input terminal ch1', and thereby constitutes a group associated with the input terminal ch1'. A pair of electrodes E3', E8' is electrically connected in common to the input terminal ch2', and thereby constitutes a group associated with the input terminal ch2'. A pair of electrodes E4', E7' is electrically connected in common to the input terminal ch3', and thereby constitutes a group associated with the input terminal ch3'. Thus, the plurality of electrodes Ei' (electrodes E1' to E8') each belongs to one of the plurality of groups each of which two of the electrodes Ei' belong to.

In the input device D1, a permutation of the groups which at least three electrodes Ei', continuously aligned thus forming a set and arbitrarily selected from the plurality of electrodes Ei', respectively belong to is different by each set of at least three electrodes Ei'. This can be paraphrased as follows.

The electrodes. E1' to E3', the electrodes E2' to E4', the electrodes E3' to E5', the electrodes E4' to E6', the electrodes E5' to E7', and the electrodes E6' to E8' respectively form the set of electrodes Ei'. Then, the permutation of the groups which the electrodes E1' to E3' respectively belong to (0, 1, 2), the permutation of the groups which the electrodes E2' to E4' respectively belong to (1, 2, 3), the permutation of the groups which the electrodes E3' to E5' respectively belong to (2, 3, 1), the permutation of the groups which the electrodes E4' to E6' respectively belong to (3, 1, 0), the permutation of the groups which the electrodes E5' to E7' respectively belong to (1, 0, 3), and the permutation of the groups which the electrodes E6' to E8' respectively belong to (0, 3, 2) are different from one another.

The foregoing can also be paraphrased as follows.

The electrodes E1' to E4', the electrodes E2' to E5', the electrodes E3' to E6, the electrodes E4' to E7', and the electrodes E5' to E8' respectively form the set of electrodes Ei'. Then, the permutation of the groups which the electrodes E1' to E4' respectively belong to (0, 1, 2, 3), the permutation of the groups which the electrodes E2' to E5' respectively belong to (1, 2, 3, 1), the permutation of the groups which the electrodes E3' to E6' respectively belong to (2, 3, 1, 0), the permutation of the groups which the electrodes E4' to E7' respectively belong to (3, 1, 0, 3), and the permutation of the groups which the electrodes E5' to E8' respectively belong to (1, 0, 3, 2) are different from one another.

The IC chip 9 in the input device D1 is configured, in the case where the plurality of electrodes Ei' electrically connected to the input terminals ch0' to ch3' for y-direction position detection through the wirings 3 each serves as one of a capacitor electrode pair, so as to detect static capacitance and fluctuation thereof of such capacitor.

In a practical use of the input device D1, when the user brings the finger Fg close to or into contact with the transmissive plate 2, the finger Fg and the electrodes Ei' in the input device D1 located close to the finger Fg constitute a capacitor electrode pair of a relatively small spacing between each other. As a result, a signal corresponding to fluctuation in static capacitance of the capacitor electrode is input from the electrodes Ei' constituting the capacitor electrode pair with the finger Fg, to the IC chip 9 through the wiring 3 and one of the input terminals ch0' to ch1' for y-direction position detection. The IC chip 9 detects, upon receipt of such signal, the fluctuation in static capacitance with respect to each group including the electrode Ei' constituting the capacitor electrode pair with the finger Fg.

The IC chip 9 decides the position in the y-direction closely approached by the approaching object (for example the finger Fg) based on the fluctuation in static capacitance detected with respect to each group which two of the electrodes Ei' belong to. The IC chip 9 takes the following steps to decide the position in the y-direction closely approached by the finger Fg.

First, in the case where the finger Fg has contacted the transmissive plate 2 of the input device D1, the IC chip 9 detects the static capacitance fluctuation, with respect to each group which two electrodes Ei' belong to, in other words with respect to each input terminal for y-direction position detection.

The IC chip 9 then compares the magnitude of the static capacitance fluctuation of each group, or each input terminal. Then, the IC chip 9 decides to which set of the electrodes Ei' (three or four continuously aligned electrodes Ei') the region where the finger Fg is present corresponds, based on the magnitude order of the three largest static capacitance fluctuation values among the four, except for the smallest static capacitance fluctuation value, or on the magnitude of all the four static capacitance fluctuation values. Thus, the IC chip 9 decides the position in the y-direction closely approached by the finger Fg and the set of electrodes Ei' located close thereto, based on the fluctuation in static capacitance detected with respect to each group which the electrodes Ei' respectively belong to. Such deciding and identifying method are in principle the same as the foregoing method of deciding to which set of the electrodes Ei the region in the x-direction where the finger Fg is present corresponds, described based on the case where the finger Fg contacts the transmissive plate 2 (not shown in FIG. 3) at the position shown in FIG. 3.

Then with respect to the plurality of positions in the y-direction, of the identified set of electrodes Ei', the weighted average is calculated utilizing the detected static capacitance fluctuation as the weight, through the following formulae (3) and (4).

$$\frac{W_1 Y_1 + W_2 Y_2 + W_3 Y_3}{W_1 + W_2 + W_3} \quad (3)$$

$$\frac{W_1 Y_1 + W_2 Y_2 + W_3 Y_3 + W_4 Y_4}{W_1 + W_2 + W_3 + W_4} \quad (4)$$

In the formula (3), $Y_1, Y_2, Y_3$ are respectively a position coordinate in the y-direction of the identified set of three continuously aligned electrodes Ei', in the input device D1. In the formula (3), $W_1, W_2, W_3$ each represent the fluctuation amount of the static capacitance of the group which the identified set of three continuously aligned electrodes Ei' belong to. In the formula (4), $Y_1, Y_2, Y_3, Y_4$ are respectively a position coordinate in the y-direction of the identified set of four continuously aligned electrodes Ei', in the input device D1. In the formula (4), $W_1, W_2, W_3, W_4$ each represent the fluctuation amount of the static capacitance of the group which the identified set of four continuously aligned electrodes Ei' belong to. Then, the weighted average value calculated through the formula (3) or (4) is adopted as the position in the y-direction closely approached by the finger Fg (approaching object).

The IC chip 9 can thus decide the position in the y-direction closely approached by the finger Fg.

Then, based on the position in the x-direction closely approached by the finger Fg and the position in the y-direction closely approached by the finger Fg decided as above, the position closely approached by the finger Fg in the detection region (two-dimensional plane) of the input device D1 is decided and identified.

The input device D1 is capable of detecting the position in the x-direct ion closely approached by the approaching object, with a greater number of electrodes Ei than the number of input terminals ch0 to ch3 for position detection in the x-direction provided in the IC chip 9 (controller). Likewise, the input device D1 is capable of detecting the position in the y-direction closely approached by the approaching object, with a greater number of electrodes Ei' than the number of input terminals ch0' to ch3' for position detection in the y-direction provided in the IC chip 9. The input device D1 thus configured is appropriate, for example, for: improving position detection accuracy maintaining the detection region size unchanged, with the IC chip 9 including a relatively small number of input terminals. Also, the input device D1 is appropriate, for example, for expanding the detection region maintaining the position detection accuracy unchanged, with the IC chip 9 including a relatively small number of input terminals.

In the input device D1, as described above, the average value based on the position in the x-direction of the identified set of electrodes Ei (three or four continuously aligned electrodes Ei), weighted by the static capacitance fluctuation detected from each group which the electrodes Ei belong to, is adopted as the position in the x-direction closely approached by the finger Fg (approaching object). Such arrangement contributes to achieving high detection accuracy with respect to the position of the approaching object in the x-direction.

In the input device D1, as described above, the average value based on the position in the y-direction of the identified set of electrodes Ei' (three or four continuously aligned electrodes Ei'), weighted by the static capacitance fluctuation detected from each group which the electrodes Ei belong to, is adopted as the position in the y-direction closely approached by the finger Fg (approaching object). Such arrangement contributes to achieving high detection accuracy with respect to the position of the approaching object in the y-direction.

Figure 4:
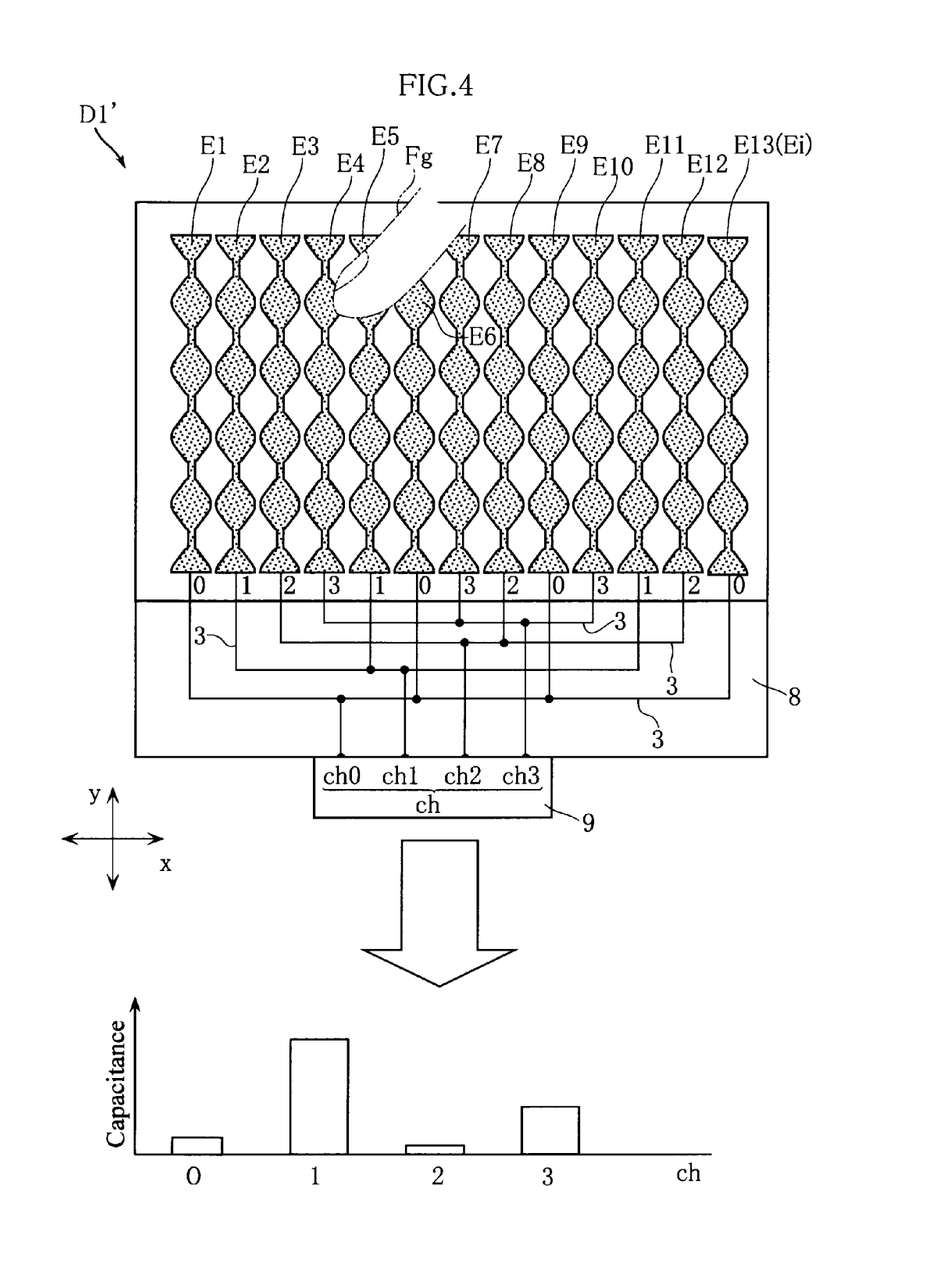
FIG. 4 includes a schematic diagram showing a connection arrangement between an IC chip and a plurality of electrodes for detection in an input device modified from FIGS. 1 and 2, and a graph showing an example of static capacitance fluctuation detected by the IC chip through a set of input terminals (input channels) in the IC chip.

FIG. 4 includes a schematic diagram showing an electrical connection arrangement between the IC chip 9 (more particularly, input terminals for x-direction position detection ch0 to ch3) and the plurality of electrodes Ei (i=1, 2, . . . , n) for x-direction position detection in an input device D1' which is a variation of the input device D1, and a graph showing an example of static capacitance fluctuation detected by the IC chip 9 through the input terminals for x-direction position detection ch0 to ch3, with respect to each group, to which the electrodes Ei belong (the graph indicates the increments of the static capacitance). The input device D1' is, as is apparent from FIG. 4, different from the input device D1 in that the number of electrodes Ei for x-direction position detection (n) is 13 instead of 8, and that the number of electrodes Ei' for y-direction position detection (m) is 13 instead of 8. The structure of the remaining portions of the input device D1' is the same as that of the input device D1.

In the input device D1', a predetermined combination of three or four of the electrodes Ei is electrically connected in common to one of the input terminals ch0 to ch3, thereby constituting a group. More specifically, a combination of electrodes E1, E6, E9, E13 is electrically connected in common to the input terminal ch0, and thereby constitutes a group associated with the input terminal ch0. A combination of electrodes E2, E5, E11 is electrically connected in common to the input terminal ch1, and thereby constitutes a group associated with the input terminal ch1. A combination of electrodes E3, E8, E12 is electrically connected in common to the input terminal ch2, and thereby constitutes a group associated with the input terminal ch2. A combination of electrodes E4, E7, E10 is electrically connected in common to the input terminal ch3, and thereby constitutes a group associated with the input terminal ch3. Thus, the plurality of electrodes Ei (electrodes E1 to E13) each belongs to one of the plurality of groups each of which the combination of the electrodes Ei belongs to.

In the input device D1', a permutation of the groups which at least three electrodes Ei, continuously aligned thus forming a set and arbitrarily selected from the plurality of electrodes Ei, respectively belong to is different by each set of at least three electrodes Ei. This can be paraphrased as follows.

The electrodes E1 to E3, the electrodes E2 to E4, the electrodes E3 to E5, the electrodes E4 to E6, the electrodes E5 to E7, the electrodes E6 to E8, the electrodes E7 to E9, the electrodes E8 to E10, the electrodes E9 to E11, the electrodes E10 to E12, and the electrodes E11 to E13 respectively form the set of electrodes Ei. Then, the permutation of the groups which the electrodes E1 to E3 respectively belong to (0, 1, 2), the permutation of the groups which the electrodes E2 to E4 respectively belong to (1, 2, 3), the permutation of the groups which the electrodes 53 to E5 respectively belong to (2, 3, 1), the permutation of the groups which the electrodes E4 to E6 respectively belong to (3, 1, 0), the permutation of the groups which the electrodes E5 to E7 respectively belong to (1, 0, 3); the permutation of the groups which the electrodes E6 to E8 respectively belong to (0, 3, 2), the permutation of the groups which the electrodes E7 to E9 respectively belong to (3, 2, 0), the permutation of the groups which the electrodes E8 to E10 respectively belong to (2, 0, 3), the permutation of the groups which the electrodes E9 to E11 respectively belong to (0, 3, 1), the permutation of the groups which the electrodes E10 to E12 respectively belong to (3, 1, 2), and the permutation of the groups which the electrodes E11 to E13 respectively belong to (1, 2, 0) are different from one another.

The foregoing can also be paraphrased as follows.

The electrodes E1 to E4, the electrodes E2 to E5, the electrodes E3 to E6, the electrodes E4 to E7, the electrodes E5 to E8, the electrodes E6 to E9, the electrodes E7 to E10, the electrodes E8 to E11, the electrodes E9 to E12, and the electrodes E10 to E13 respectively form the set of electrodes Ei. Then, the permutation of the groups which the electrodes E1 to E4 respectively belong to (0, 1, 2, 3), the permutation of the groups which the electrodes E2 to E5 respectively belong to (1, 2, 3, 1), the permutation of the groups which the electrodes E3 to E6 respectively belong to (2, 3, 1, 0), the permutation of the groups which the electrodes E4 to E7 respectively belong to (3, 1, 0, 3), the permutation of the groups which the electrodes E5 to E8 respectively belong to (1, 0, 3, 2), the permutation of the groups which the electrodes E6 to E9 respectively belong to (0, 3, 2, 0), the permutation of the groups which the electrodes E7 to E10 respectively belong to (3, 2, 0, 3), the permutation of the groups which the electrodes E8 to E11 respectively belong to (2, 0, 3, 1), the permutation of the groups which the electrodes E9 to E12 respectively belong to (0, 3, 1, 2), and the permutation of the groups which the electrodes E10 to E13 respectively belong to (3, 1, 2, 0) are different from one another.

In the input device D1', further, in addition to the configuration that the permutation of the groups which at least three electrodes Ei forming a set respectively belong to is different by each such set of electrodes Ei, the electrodes Ei are also arranged as follows. The permutation of two groups which two electrodes E1, E2, continuously aligned at an end portion of the plurality of electrodes Ei aligned in the x-direction, respectively belong to (0, 1) is different from the inverse permutation of two groups which two electrodes E12, E13, continuously aligned at the other end portion of the plurality of electrodes Ei, respectively belong to (0, 2). In this embodiment, since the permutation formed by the electrodes E12, E13 is (2, 0) and the inverse permutation thereby formed is (0, 2), the permutation formed by the electrodes E1, E2 (0, 1) is different from the inverse permutation formed by the electrodes E12, E13 (0, 2).

Meanwhile, in the input device D1', a predetermined combination of three or four of the electrodes Ei (for y-direction position detection) is electrically connected in common to one Of the input terminals ch0' to ch3', thereby constituting a group, just as the predetermined combination of three or four of the electrodes Ei (for x-direction position detection) is electrically connected in common to one of the input terminals ch0 to ch3, thereby constituting a group. More specifically, a combination of electrodes E1', E6', E9', E13' is electrically connected in common to the input terminal ch0', and thereby constitutes a group associated with the input terminal ch0'. A combination of electrodes E2', E5', E11' is electrically connected in common to the input terminal ch1', and thereby constitutes a group associated with the input terminal ch1'. A combination of electrodes E3', E8', E12' is electrically connected in common to the input terminal ch2', and thereby constitutes a group associated with the input terminal ch2'. A combination of electrodes E4', E7', E10' is electrically connected in common to the input terminal ch3', and thereby constitutes a group associated with the input terminal ch3'. Thus, the plurality of electrodes Ei' (electrodes E1' to E13') each belongs to one of the plurality of groups each of which the combination of the electrodes Ei' belongs to.

In the input device D1', a permutation of the groups which at least three electrodes Ei', continuously aligned thus forming a set and arbitrarily selected from the plurality of electrodes Ei', respectively belong to is different by each set of at least three electrodes Ei'. This can be paraphrased as follows.

The electrodes E1' to E3', the electrodes E2' to E4', the electrodes E3' to E5', the electrodes E4' to E6', the electrodes E5' to E7', the electrodes E6' to the electrodes E7' to E9', the electrodes E8' to E10', the electrodes E9' to E11', the electrodes E10' to E12', and the electrodes E11' to E13' respectively form the set of electrodes Ei'. Then, the permutation of the groups which the electrodes E1' to E3' respectively belong to (0, 1, 2), the permutation of the groups which the electrodes E2' to E4' respectively belong to (1, 2, 3), the permutation of the groups which the electrodes E3' to E5' respectively belong to (2, 3, 1), the permutation of the groups which the electrodes E4' to E6' respectively belong to (3, 1, 0), the permutation of the groups which the electrodes E5' to E7' respectively belong to (1, 0, 3), the permutation of the groups which the electrodes E6' to E8' respectively belong to (0, 3, 2), the permutation of the groups which the electrodes E7' to E9' respectively belong to (3, 2, 0), the permutation of the groups which the electrodes E8' to E10' respectively belong to (2, 0, 3), the permutation of the groups which the electrodes E9' to E11' respectively belong to (0, 3, 1), the permutation of the groups which the electrodes E10' to E12' respectively belong to (3, 1, 2), and the permutation of the groups which the electrodes E11' to E13' respectively belong to (1, 2, 0) are different from one another.

The foregoing can also be paraphrased as follows.

The electrodes E1' to E4', the electrodes E2' to E5', the electrodes E3' to E6', the electrodes E4' to E7', the electrodes E5' to E8', the electrodes E6' to E9', the electrodes E7' to E10', the electrodes E8' to E11', the electrodes E9' to E12', and the electrodes E10' to E13' respectively form the set of electrodes Ei'. Then, the permutation of the groups which the electrodes E1' to E4' respectively belong to (0, 1, 2, 3), the permutation of the groups which the electrodes E2' to E5' respectively belong to (1, 2, 3, 1), the permutation of the groups which the electrodes E3' to E6' respectively belong to (2, 3, 1, 0), the permutation of the groups which the electrodes E4' to E7' respectively belong to (3, 1, 0, 3), the permutation of the groups which the electrodes E5' to E8' respectively belong to (1, 0, 3, 2), the permutation of the groups which the electrodes E6' to E9' respectively belong to (0, 3, 2, 0), the permutation of the groups which the electrodes E7' to E10' respectively belong to (3, 2, 0, 3), the permutation of the groups which the electrodes E8' to E11' respectively belong to (2, 0, 3, 1), the permutation of the groups which the electrodes E9' to E12' respectively belong to (0, 3, 1, 2), and the permutation of the groups which the electrodes E10' to E13' respectively belong to (3, 1, 2, 0) are different from one another.

In the input device D1', further, in addition to the configuration that the permutation of the groups which at least three electrodes Ei' forming a set respectively belong to is different by each such set of electrodes Ei', the electrodes Ei' are also arranged as follows. The permutation of two groups which two electrodes E1', E2', continuously aligned at an end portion of the plurality of electrodes Ei' aligned in the y-direction, respectively belong to (0, 1) is different from the inverse permutation of two groups which two electrodes 512', E13', continuously aligned at the other end portion of the plurality of electrodes Ei', respectively belong to (0, 2). In this embodiment, since the permutation formed by the electrodes E12', E13' is (2, 0) and the inverse permutation thereby formed is (0, 2), the permutation formed by the electrodes E1', E2' (0, 1) is different from the inverse permutation formed by the electrodes E12', E13' (0, 2).

In the input device D1', the IC chip 9 can decide the position in the x-direction closely approached by the finger Fg, as well as the position in the y-direction closely approached by the finger Fg, in the same way as described regarding the input device D1. To decide the position in the x-direction closely approached by the finger Fg, the foregoing formula (1) or (2) is employed, so as to calculate the weighted average of the position. To decide the position in the y-direction closely approached by the finger Fg, the foregoing formula (3) or (4) is employed, so as to calculate the weighted average of the position.

Therefore, the input device D1' is capable of deciding or identifying the position closely approached by the finger Fg in the detection region (two-dimensional plane), as the input device D1, based on the position in the x-direction closely approached by the finger Fg and the position in the y-direction closely approached by the finger Fg.

The input device D1' is capable of detecting the position in the x-direction closely approached by the approaching object, with a greater number of electrodes Ei than the number of input terminals ch0 to ch3 for position detection in the x-direction provided in the IC chip 9 (controller). Likewise, the input device D1' is capable of detecting the position in the y-direction closely approached by the approaching object, with a greater number of electrodes Ei' than the number of input terminals ch0' to ch3' for position detection in the y-direction provided in the IC chip 9. The input device D1' thus configured is appropriate, for example, for improving position detection accuracy maintaining the detection region size unchanged, with the IC chip 9 including a relatively small number of input terminals. Also, the input device D1' is appropriate, for example, for expanding the detection region maintaining the position detection accuracy unchanged, with the IC chip 9 including a relatively small number of input terminals.

In the input device D1', as described above, the average value based on the position in the x-direction of the identified set of electrodes Ei (three or four continuously aligned electrodes Ei), weighted by the static capacitance fluctuation detected from each group which the electrodes Ei belong to, is adopted as the position in the x-direction closely approached by the finger Fg (approaching object). Such arrangement contributes to achieving high detection accuracy with respect to the position of the approaching object in the x-direction.

In the input device D1', as described above, the average value based on the position in the y-direction of the identified set of electrodes Ei' (three or four continuously aligned electrodes Ei'), weighted by the static capacitance fluctuation detected from each group which the electrodes Ei belong to, is adopted as the position in the y-direction closely approached by the finger Fg (approaching object). Such arrangement contributes to achieving high detection accuracy with respect to the position of the approaching object in the y-direction.

In the input device D1', whereas the electrodes E1, E13 included in the electrodes Ei are electrically connected in common to the input terminal ch0 of the IC chip 9 and thus belong to the same group associated with the input terminal ch0, the permutation formed by the electrodes E1, E2 (0, 1) is different from the inverse permutation formed by the electrodes E12, E13 (0, 2), as stated above. Such configuration is appropriate for identifying, in the case where the approaching object (for example, finger Fg) is located either in the vicinity of an end portion in the x-direction or of the other end portion of the detection region of the input device D1', in which of the vicinity of an end portion in the x-direction or of the other end portion the approaching object is located.

In the input device D1', whereas the electrodes E1', E13' included in the electrodes Ei' are electrically connected in common to the input terminal ch0' of the IC chip 9 and thus belong to the same group associated with the input terminal ch0', the permutation formed by the electrodes E1', E2' (0, 1) is different from the inverse permutation formed by the electrodes E12', E13' (0, 2), as stated above. Such configuration is appropriate for identifying, in the case where the approaching object (for example, finger Fg) is located either in the vicinity of an end portion in the y-direction or of the other end portion of the detection region of the input device D1', in which of the vicinity of an end portion in the y-direction or of the other end portion the approaching object is located.

The scope of the present invention is not limited to the foregoing embodiments. In the input device D1, D1', the number of electrodes Ei and the number of electrodes Ei' may be different The number of electrodes Ei and electrodes Ei' may be different from 8 and 13, for example one of 14 to 22. In the case where 22 electrodes Ei are provided, permutations of the groups which the electrodes E1 to E22 respectively belong to (input terminals for x-direction position detection to which the electrodes E1 to E22 are respectively electrically connected and associated) may be arranged as, for example, (0, 1, 2, 3, 1, 0, 3, 2, 0, 1, 3, 2, 1, 0, 2, 3, 0, 2, 1, 3, 0, 1) or (3, 2, 1, 0, 2, 3, 0, 1, 2, 3, 1, 0, 3, 2, 0, 3, 0, 2, 1, 3, 2). In the case where 22 electrodes Ei' are provided, permutations of the groups which the electrodes E1' to E22' respectively belong to (input terminals for y-direction position detection to which the electrodes E1' to E22' are respectively electrically connected and associated) may be arranged as, for example, (0, 1, 2, 3, 1, 0, 3, 2, 0, 1, 3, 2, 1, 0, 2, 3, 0, 2, 1, 3, 0, 1) or (3, 2, 1, 0, 2, 3, 0, 1, 2, 3, 1, 0, 3, 2, 0, 1, 3, 0, 2, 1, 3, 2).

Specific structure of each component of the input device according to the present invention may be designed in various different manners. Although the foregoing embodiments represent the input device that utilizes static capacitance, the input device according to the present invention is not limited thereto. For example, a resistive film or infrared beam may be employed instead. The number of input terminal for x-direction position detection provided in the IC chip 9 may be 3 or 5 or more, instead of 4. Although the electrodes Ei for x-direction position detection and the electrodes Ei' for y-direction position detection are provided on different substrates in the embodiment, the electrodes Ei, Ei' may both be provided on a single substrate. It is not mandatory that the input device according to the present invention includes the LCD panel P1.

Although the foregoing embodiment exemplifies the configuration that the electrodes Ei, Ei' are aligned in parallel in an orthogonal coordinate system, the plurality of electrodes Ei may be concentrically aligned in parallel so as to circumferentially extend, and the plurality of electrodes Ei' may extend in a radial direction orthogonal to the circumference, so as to intersect with the electrodes Ei.

It is not mandatory to provide the spacers in the input device according to the present invention. Also, the input device according to the present invention may be applied not only to a mobile phone, but also to various other apparatuses that include a touch panel, such as a digital camera, a personal navigation device, an ATM, and so forth.

The invention claimed is:

1. An input device comprising:
    a plurality of detectors aligned in one direction for respectively detecting a close approach of an approaching object;
    a transmissive plate configured, upon the close approach of the approaching object, to be disposed between the approaching object and the plurality of detectors; and
    a controller including a plurality of input channels;
    wherein
    each of the detectors belongs to one of a plurality of groups each of which two or more detectors belong to,
    the plurality of detectors in each of the groups is connected in common to one of the input channels associated therewith in the controller,
    a permutation of the groups which at least three detectors, continuously aligned thus forming a set and arbitrarily selected from the plurality of detectors, respectively belong to is different by each set of at least three detectors, and
    said at least three detectors are each connected to a different one of the plurality of input channels.

2. The input device according to claim 1, wherein a permutation of two groups which two detectors, continuously aligned at an end portion of the plurality of detectors aligned in the one direction, respectively belong to is different from an inverse permutation of two groups which two detectors, continuously aligned at the other end portion of the plurality of detectors aligned in the one direction, respectively belong to.

3. The input device according to claim 1, wherein the controller decides a position in the one direction closely approached by the approaching object, based on all of a plurality of detected values obtained through the plurality of input channels.

4. The input device according to claim 1, wherein the controller decides the position in the one direction closely approached by the approaching object, based on a part of the plurality of detected values obtained through the plurality of input channels.

5. The input device according to claim 1, wherein the controller identifies the position in the one direction closely approached by the approaching object and the set of detectors located close to that position, based on the plurality of detected values obtained through the plurality of input channels, and calculates a weighted average with respect to a plurality of positions of the set of detectors in the one direction, utilizing the detected values as the weight.

6. The input device according to claim 1, wherein the plurality of detectors is constituted of a plurality of electrodes each extending in parallel in a direction intersecting with the direction in which the plurality of detectors is aligned;
the approaching object is electrically conductive;
the controller is capable of detecting fluctuation in static capacitance between the detector belonging to each group and the approaching object caused by the close approach of the approaching object to the detector, with respect to each group; and
the controller decides the position in the one direction closely approached by the approaching object, based on the fluctuation in static capacitance detected with respect to each group.

7. The input device according to claim 6, wherein the controller identifies the position in the one direction closely approached by the approaching object and the set of detectors located close to that position, based on the fluctuation in static capacitance detected with respect to each group, and calculates a weighted average with respect to a plurality of positions of the set of detectors in a direction, utilizing the fluctuation in static capacitance as the weight.

8. An input device comprising:
a plurality of first detectors for respectively detecting a close approach of an approaching object, and a plurality of second detectors for respectively detecting a close approach of the approaching object, the first detector being aligned in a first direction and plurality of second detectors being aligned in a second direction intersecting with the first direction;
a transmissive plate configured, upon the close approach of the approaching object, to be disposed between the approaching object and the plurality of first detectors or the plurality of second detectors; and
a controller including a plurality of first input channels for position detection in the first direction, and a plurality of second input channels for position detection in the second direction; wherein
each of the first detectors belongs to one of a plurality of first groups each of which two or more of the first detectors belong to;
the plurality of first detectors in each of the first groups is connected in common to one of the first input channels associated therewith in the controller;
a permutation of the first groups which at least three of the first detectors, continuously aligned thus forming a set and arbitrarily selected from the plurality of first detectors, respectively belong to is different by each set of at least three of the first detectors;
each of the second detectors belongs to one of a plurality of second groups each of which two or more of the second detectors belong to;
the plurality of second detectors in each of the second groups is connected in common to one of the second input channels associated therewith in the controller;
a permutation of the second groups which at least three of the second detectors, continuously aligned thus forming a set and arbitrarily selected from the plurality of second detectors, respectively belong to is different by each set of at least three of the second detectors;
said at least three of the first detectors are each connected to a different one of the plurality of first input channels; and
said at least three of the second detectors are each connected to a different one of the plurality of second input channels.

9. The input device according to claim 8, wherein a permutation of two groups which two of the first detectors, continuously aligned at an end portion of the plurality of first detectors aligned in the first direction, respectively belong to is different from an inverse permutation of two groups which two of the first detectors, continuously aligned at the other end portion of the plurality of first detectors aligned in the first direction, respectively belong to.

10. The input device according to claim 8, wherein a permutation of two groups which two of the second detectors, continuously aligned at an end portion of the plurality of first detectors aligned in the second direction, respectively belong to is different from an inverse permutation of two groups which two of the second detectors, continuously aligned at the other end portion of the plurality of second detectors aligned in the second direction, respectively belong to.

11. The input device according to claim 8, wherein the controller decides a position in the first direction closely approached by the approaching object, based on all of a plurality of detected values obtained through the plurality of first input channels, and a position in the second direction closely approached by the approaching object, based on all of a plurality of detected values obtained through the plurality of second input channels.

12. The input device according to claim 8, wherein the controller decides the position in the first direction closely approached by the approaching object, based on a part of the plurality of detected values obtained through the plurality of first input channels, and the position in the second direction closely approached by the approaching object, based on a part of the plurality of detected values obtained through the plurality of second input channels.

13. The input device according to claim 8, wherein the controller identifies the position in the first direction closely approached by the approaching object and the set of first detectors located close to that position, based on the plurality of detected values obtained through the plurality of first input channels, and calculates a weighted average with respect to a plurality of positions of the set of first detectors in the first direction, utilizing the detected values as the weight.

14. The input device according to claim 8, wherein the controller identifies the position in the second direction closely approached by the approaching object and the set of second detectors located close to that position, based on the plurality of detected values obtained through the plurality of second input channels, and calculates a weighted average with respect to a plurality of positions of the set of second detectors in the second direction, utilizing the detected values as the weight.

15. The input device according to claim 8, wherein:
the plurality of first detectors is constituted of a plurality of electrodes each extending in parallel in a direction intersecting with the first direction;
the approaching object is electrically conductive;
the controller is capable of detecting fluctuation in static capacitance between the first detector belonging to each of the first groups and the approaching object caused by the close approach of the approaching object to the first detector, with respect to each of the first groups; and
the controller decides the position in the first direction closely approached by the approaching object, based on the fluctuation in static capacitance detected with respect to each of the first groups.

16. The input device according to claim 15, wherein the controller identifies the position in a direction closely approached by the approaching object and the set of first detectors located close to that position, based on the fluctuation in static capacitance detected with respect to each of the first groups, and calculates a weighted average with respect to a plurality of positions of the set of first detectors in the first direction, utilizing the fluctuation in static capacitance as the weight.

17. The input device according to claim 8, wherein:

the plurality of second detectors is constituted of a plurality of electrodes each extending in parallel in a direction intersecting with the second direction;

the approaching object is electrically conductive;

the controller is capable of detecting fluctuation in static capacitance between the second detector belonging to each of the second groups and the approaching object caused by the close approach of the approaching object to the second detector, with respect to each of the second groups; and the controller decides the position in the second direction closely approached by the approaching object, based on the fluctuation in static capacitance detected with respect to each of the second groups.

18. The input device according to claim 17, wherein the controller identifies the position in a direction closely approached by the approaching object and the set of second detectors located close to that position, based on the fluctuation in static capacitance detected with respect to each of the second groups, and calculates a weighted average with respect to a plurality of positions of the set of second detectors in the second direction, utilizing the fluctuation in static capacitance as the weight.

* * * * *